United States Patent [19]

Horst et al.

[11] Patent Number: 4,571,673

[45] Date of Patent: Feb. 18, 1986

[54] ENHANCED CPU MICROBRANCHING ARCHITECTURE

[75] Inventors: Robert W. Horst, Cupertino; Richard L. Harris, San Jose, both of Calif.

[73] Assignee: Tandem Computers Incorporated, Cupertino, Calif.

[21] Appl. No.: 537,886

[22] Filed: Sep. 29, 1983

[51] Int. Cl.⁴ .......................... G06F 9/38; G06F 9/42
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,725,868 | 4/1973 | Malmer, Jr. et al. | 364/200 |
| 3,840,861 | 10/1974 | Amdahl | 364/200 |
| 4,222,101 | 9/1980 | Avsan et al. | 364/200 |
| 4,307,445 | 12/1981 | Tredennick et al. | 364/200 |
| 4,334,126 | 6/1982 | Slingsby | 364/900 X |
| 4,373,180 | 2/1983 | Linde | 364/200 |
| 4,425,628 | 1/1984 | Bedard et al. | 364/900 |

*Primary Examiner*—Harvey E. Springborn
*Attorney, Agent, or Firm*—Lyon & Lyon

[57] ABSTRACT

Hardware for performing microcode branching in a pipeline central processing unit allows for two different speeds of branches which can be used by microcode and includes flexibility to optionally inhibit lines of microcode which are in the pipeline when a branch has been sensed. A default branch path can be taken for a test result not yet available and can be replaced with a correct branch target during a clock pause if the test result is false. A return address stack is provided with decoupling loading and pushing to accommodate the two branching speeds. The microcode can specify loading the return address stack with a literal or register value to allow vectored branching and return to a desired line after a delayed call.

1 Claim, 5 Drawing Figures

# ENHANCED CPU MICROBRANCHING ARCHITECTURE

FIELD OF THE INVENTION

The present invention relates to central processing units of data processing systems. More particularly, the invention relates to microbranching within sets of microinstructions for use within a central processing unit of a data processing system and the hardware for performing microbranching.

BACKGROUND OF THE INVENTION

The concept of microbranching, that is, branching within the microcode level of microinstructions in a central processing unit of data processing systems is well known in the art. It is known to perform microbranching upon selected results of selected test conditions in the central processing units of data processing systems. Within data processing systems which employ pipelined architectures, it is known to perform microbranching as the result of tests which are performed during the execution of different ranks of the microcode field for a single microinstruction. Some prior art systems have the capability to only do "fast" branches, that is, to branch on the result of test conditions which are sensed during the execution of the rank one microcode bit field in any given microinstruction. Other systems have had the capability to branch only in a "slow" manner, that is, upon the results of test conditions which occur during execution of the rank two microcode for any given microinstruction. Some of the systems known in the prior art which are capable of performing microbranching have the capability to inhibit lines of microcode which enter the pipeline after the line of microcode which causes the branch to occur. The necessity to inhibit the execution of such later lines of microcode is dependent on the function that the microcode performs and whether it is compatible with the branch which is taken by the CPU under the direction of the microcode as the result of the test conditions.

While these prior art microbranching architecture schemes have provided flexibility to system designers and have made possible the design of systems which are capable of making more decisions and thus functioning on higher levels of abstraction, there is still room for improvement in the design and execution of such system hardware.

For example, systems which are not capable of performing both fast and slow branches are not as flexible as systems which are so designed. Such systems do not generally have the capability of performing more than one test at any one particular time or even the capability of performing more than one test during the execution of any one microinstruction. Some such systems have the capability of only performing fast microbranches and some systems only perform slow microbranches. The systems which are capable of only performing fast microbranches cannot branch on conditions generated by the rank two execution of the current microinstruction. The obvious reason for this shortcoming is that the condition which invokes the decision to branch occurs during a later period in time than is capable of being sensed by the branching hardware.

On the other hand, systems which only perform slow branches must always wait an extra clock cycle for the conditions which invoke the branch to occur under the direction of rank two microcode and thus lose a clock cycle before execution of microcode at the branch target can begin.

Another drawback of the prior art systems which are capable of performing slow microcode branching is that they lack the flexibility to selectively inhibit either one or both lines of microcode which enter the pipeline before the branch decision is made. Likewise, prior art systems which are capable of performing fast microbranching typically lack the flexibility to selectively inhibit either one or both of the current or next lines of microcode which enter the pipeline before the branch decision can be made.

Furthermore, prior art systems which allow lines of microcode to execute after the decision to microbranch as the result of a test condition has been made generally do not have the capability of calling a subroutine and then returning to any other line of microcode other than the line of microcode which followed the line of microcode which invoked the branch.

Another drawback of currently employed microbranching hardware is that the hardware employed by the prior art for performing both fast and slow microbranching cannot be checked against one another without the need to employ additional checking hardware.

Finally, a return address stack is commonly employed by systems which perform any type of microbranching. This return address stack is used as a vector by the system to point to an address to which the processor should return to resume executing the microcode it was executing prior to the branch being taken. Prior art return address architectures known to the inventors of the present invention share the common architectural feature that the loading of the return address is not decoupled from the rotation of the stack. This tends to reduce flexibility or increase the hardware cost of prior CPU's.

Therefore, it is an object of the present invention to provide an architecture for use in central processing units for performing microbranching which is capable of performing both fast and slow microbranching.

It is a further object of the present invention to provide a microbranching architecture which is capable of performing more than one test during the execution of any single microinstruction.

It is a further object of the present invention to provide a microbranching architecture which is capable of inhibiting either or both of the lines of microcode which enter the pipeline during a slow microcode branch.

It is yet another object of the present invention to provide a microbranching architecture which is capable of inhibiting either or both of the current and the following line microcode which enter the pipeline during a fast microbranch.

Yet another object of the present invention is to provide a microbranching architecture which allows lines of microcode in the pipeline to be executed and has the capability of calling a subroutine and then executing any line microcode in the control store upon returning from the subroutine.

A further object of the present invention is to provide for a microbranching architecture capable of performing both fast and slow microcode jumps and having the further capability of allowing the operations of both the fast and slow microcode jumping hardware to be checked against one another.

It is also an object of the present invention to provide a return address stack for use in performing microbranching in which the return address loading is decoupled from the rotating of the stack.

These and other objects of the present invention will become apparent to those of ordinary skill in the art from an examination of the specification, accompanying drawings, and appended claims.

BRIEF DESCRIPTION OF THE PRESENT INVENTION

An architecture for use in a CPU for performing microbranching can selectively elect to execute either the next line of microcode in a control store or a line of microcode pointed to by a vector which is supplied in response to the positive result of a test that occurs during the execution of the rank one portion of the microcode for the current microinstruction or to a vector supplied as the result of the execution of the rank two portion of the microcode of the current microinstruction. If both conditions are met, i.e., both the test performed during the rank one microcode execution and rank two microcode execution prove true, the branch address pointed to by the result of the rank two microcode portion of the execution is chosen in priority over the other one.

If a microbranch is selected, either none, one or all of the instructions which have entered the pipeline since the instruction which caused the microbranch can be optionally inhibited.

In addition, an extra block of hardware logic enables the system to proceed as if the decision to not take the microbranch was correctly made and proceed to load the pipeline upon that assumption but to recover from the error if that assumption was incorrect and substitute a vector to the microbranch address at a later time. During the time in which this address is fetched and loaded, pause circuitry halts other system clocks.

When a decision to take a microcode call is made, a return address is placed on a return address stack. This return address is not limited to the address which was pending when the microbranch was taken, but may be any address in control store. The loading of a return address onto the stack is decoupled from the rotating of the stack.

DETAILED DESCRIPTION OF THE INVENTION

Microbranching is the ability of a machine which is executing microcode to inhibit the sequential execution of the next line of microcode in favor of executing a series of instructions which are pointed to by a vector in response to the true result of a test condition. The present invention is particularly useful in conjunction with central processing unit hardware like that described in copending application Ser. Nos. 537,038, 537,429 and 537,877 filed Sept. 29, 1983, which are expressly incorporated herein by reference.

Figure 1:
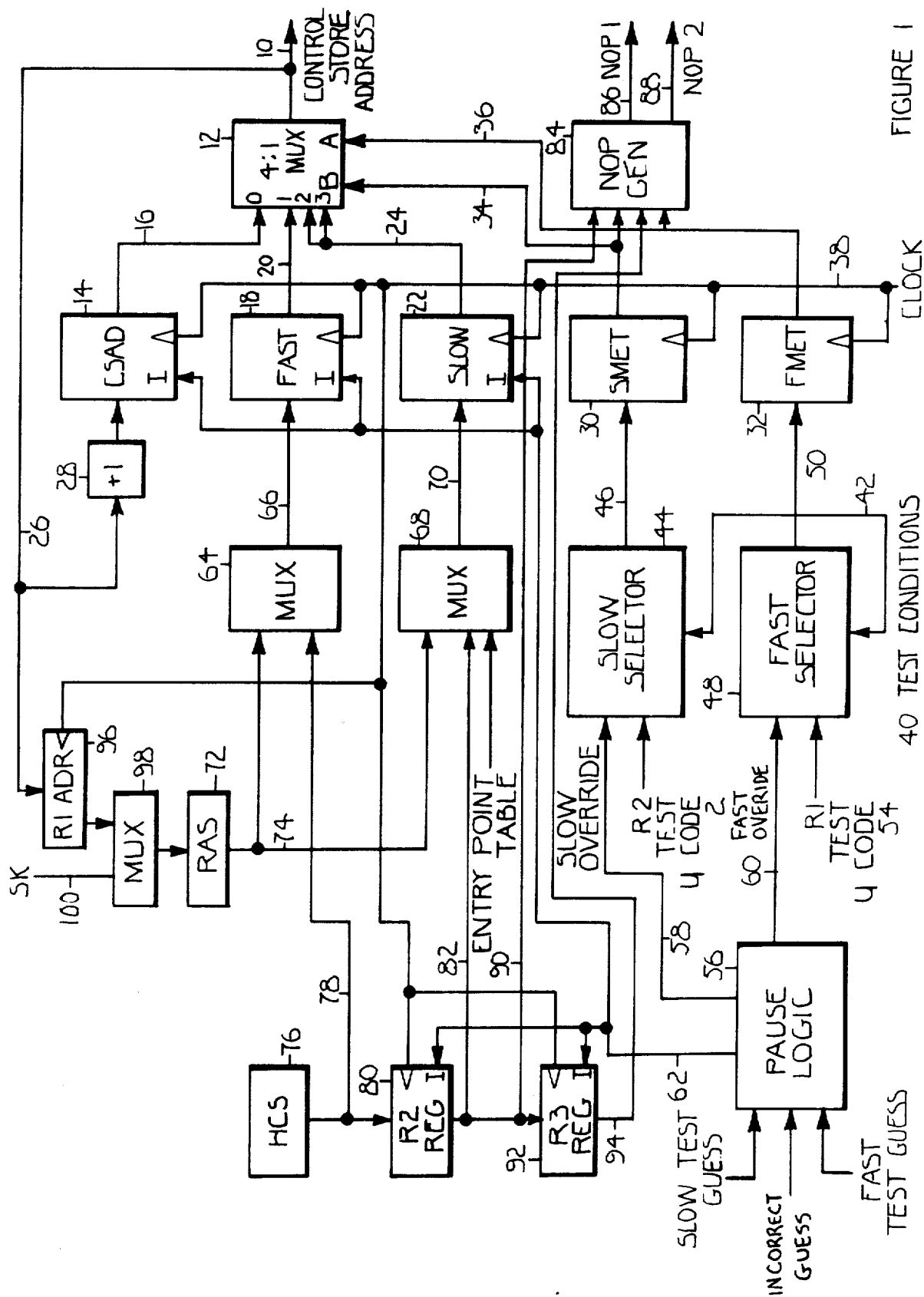
FIG. 1 is a block diagram of the dual speed microbranching hardware in a preferred embodiment of the present invention.

Microinstructions are typically accessed from a control store by placing the address of the desired microinstruction on a control store address bus. Referring first to FIG. 1, in the present invention, addresses for lines of microcode are presented on control store bus 10, which may be as wide as necessary to accommodate the number of address bits in a system. Control store bus 10 is driven by control store address bus 4:1 multiplexer 12. Multiplexer 12 selects from among three data sources: control store address register 14, via line 16; fast microbranch register 18 via line 20; and slow microbranch register 22 via line 24.

During sequential microinstruction operation, i.e., when microbranching not taking place, control store bus 10 is fed back via line 26, incremented in incrementing circuit 28 and fed back into control store address register 14 after the next clock cycle from the system clock. Thus, during normal operation control store address bus 10 contains the address one greater than the previous address on address bus 10. This address is held in control store address register 14, and connected to multiplexer 12 via line 16.

When, however, microbranching is desired, multiplexer 12 selects a vector address from either fast microbranch 18 or slow microbranch register 22. It does so according to the states of slow test met (SMET) flip-flop 30 and fast test met (FMET) flip-flop 32 which drive the select input A and B of multiplexer 12 via lines 34 and 36 respectively. As can be seen from FIG. 1, control store address register 14, fast microbranch register 18, slow microbranch register 22, FMET flip-flop 30 and fast FMET flip-flop 32 are all driven from the system clock via line 38.

SMET flip-flop 30 and FMET flip-flop 32 are driven as a result of one of numerous test conditions 40 which are supplied via multiple lines 42 to slow test selector 44 which drives SMET flip-flop 30 via line 46 and fast test selector 48 which drives FMET flip-flop 32 via line 50. This will be explained more fully with respect to FIG. 5. Both slow test selector 44 and fast test selector 48 select from among the various test conditions 40 presented on their multiple lines 42 in accordance with the contents of encoded microcode fields. Slow test selector 44 uses a microcode field from the rank 2 portion of the microcode to select which one of test conditions 40 it will test. Fast test selector 48 uses a microcode field in the rank one microcode to select which one of test conditions 40 it will act upon.

By use of the hardware of the present condition, a guess can be made with respect to the outcome of either one of the slow or fast tests, i.e., tests made on conditions during the rank one microcode field or those made during the enablement of the rank two microcode field so that a preliminary microbranch decision may be made prior to actual results of that test being available. While this hardware feature obviously speeds up system performance, guesses are prone to be wrong and if an incorrect guess is made the system clocks can be paused while the correct vector is supplied to control store address bus 10. This feature is implemented by pause logic 56. Pause logic 56 overrides the decision made by the guess to slow test selector unit 44 via line 58 and to fast test selector unit 48 via line 60. An additional signal supplied on line 62 inhibits the clocking of selected registers until the substitution of the correct vector has been made. The operation of pause logic 56 will be more fully explained with respect to FIG. 3.

The selection of vectors for both fast microbranch register 18 and slow microbranch register 22 are made by multiplexers. Specifically, multiplexer 64 supplies a vector to fast microbranch register 18 via line 66 and multiplexer 68 supplies a vector to slow microbranch register 22 via line 70. Multiplexer 64 and multiplexer 68 have several sources. Multiplexer 64 and multiplexer 68 may obtain a vector from the return address stack 72 via line 74. Multiplexer 64 may additionally obtain a vector from a portion of the rank one microcode field obtained at the output of the horizontal control store 76 via line 78. Thus, it can be seen that the vector supplied to fast microbranch register 18 may be specified by a portion of the rank one microcode while another portion of that same microcode specifies which test condition may cause this vector to be selected.

Multiplexer 68 may be supplied with a vector from a portion of the rank two microcode from the output of rank two register 80 via line 82. Thus, a portion of the rank two microcode field may specify the vector to which the system will branch as a result of a particular test which is also specified by another portion of that rank of microcode.

Using the hardware of the present invention, a decision may be made to inhibit either one or both or neither of the two following lines of microcode which will enter the pipeline between the time a slow branch instruction is executed and the branch target line is executed. Likewise, a decision may be made whether to inhibit the operation of a current line of code, the next line of code, or neither when a fast microcode branch is taken. The hardware responsible for implementing this function is NOP generator 84 which generates signals NOP1 and NOP2 via lines 86 and 88, respectively. NOP generator 84 makes its decision based on the conditions of the outputs of slow test met flip-flop 30, fast test met flip-flop 32, a bit field of the rank two microcode from rank two register 80 via line 90, and a bit field of the rank three microcode from rank three register 92 via line 94.

The determination of which vectors are to be selected by multiplexers 64 and 68 is controlled by fields in the rank one and rank two microcode, respectively.

As is apparent from FIG. 1, a clock pulse on line 38 places the contents of either the fast microbranch register 18, slow microbranch register 22 or control store address register 14 through multiplexer 12 and on to control store bus 10. It will be apparent that the contents of control store address bus 10 will be clocked into rank one address (R1ADR) register 96 following the next clock pulse. It is this same clock pulse which is used to register the contents of control store which are accessed by this signal. Thus, at any given time the contents of R1ADR 96 will be the vector pointing to the microcode residing in rank 1 register for execution. The contents of R1ADR 96 are therefore a vector to the nominal return address after a microcode branch has been executed.

The contents of R1ADR 96 are made available to return address stack (RAS) 72 via multiplexer 98. Since the input to return address 72 is via multiplexer 98, a vector other than the original vector appearing in R1 address register 96 may be placed in the return address stack. Multiplexer 98 is shown having another input from the SK bus 100 shown in FIG. 1 of copending application Ser. No. 537,877, filed Sept. 29, 1983.

One of the ways in which the enhanced microbranching capabilities of the present invention is realized is by allowing a means for vectoring to microcode based on a macroinstruction to be executed. For this purpose, multiplexer 68 which accesses slow microcode branch register 22 may also be sourced by the entry point table which holds a vector to the macroinstruction about to be executed. Therefore, the branching capability of the present invention encompasses vectoring microcode based on this instruction.

The hardware of a preferred embodiment of the present invention possesses the capability to optionally inhibit lines of code which enter the pipeline between the time the branching instruction enters the pipeline and the time that the decision to branch is made. These options may be coded in microcode, since it is not always desired to inhibit any of these instructions.

Figure 2:
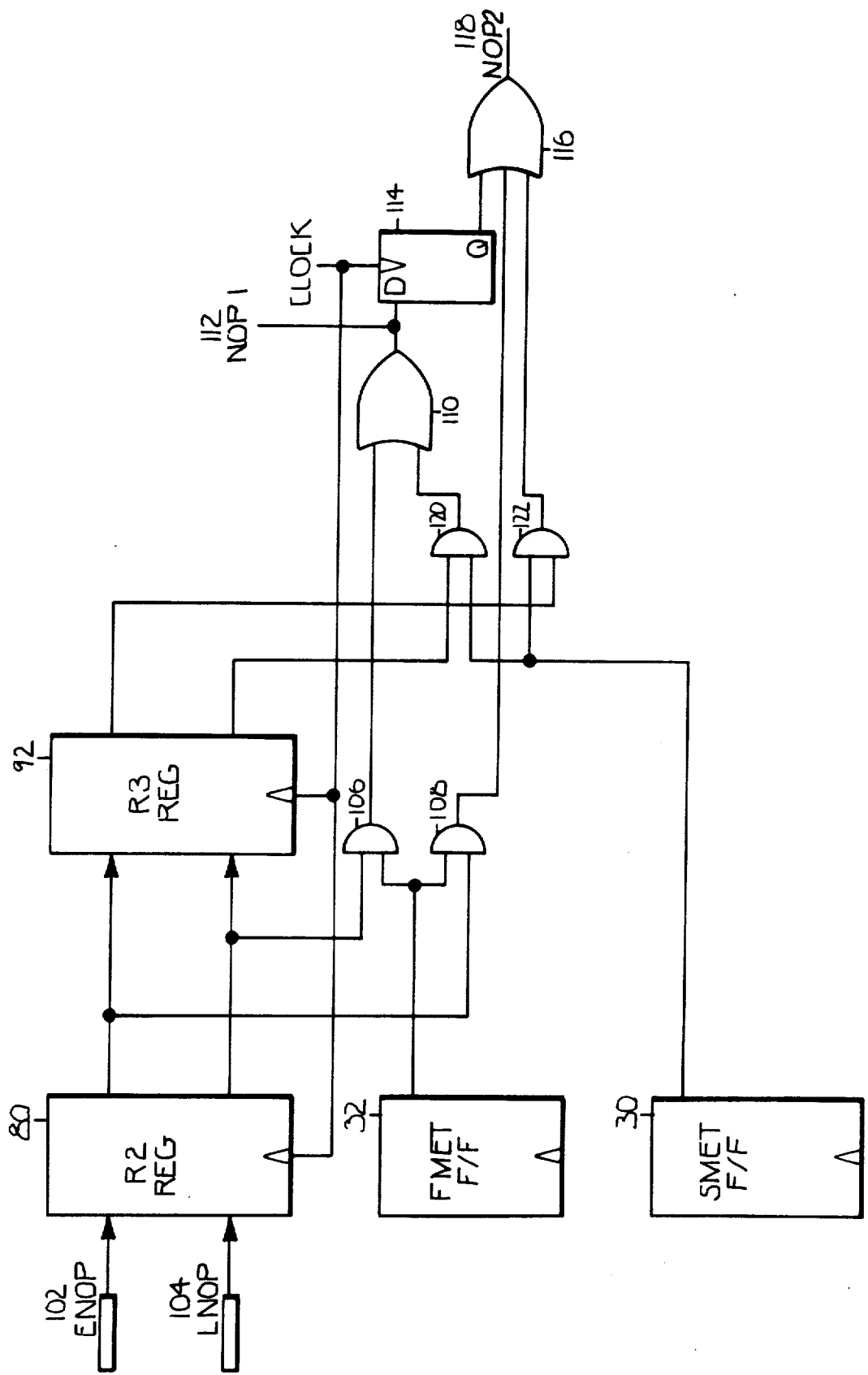
FIG. 2 is a block and logic level diagram of the hardware for optionally inhibiting operations in the pipeline after a microbranch has been taken.

Referring now to FIG. 2, a block diagram of the hardware used to optionally inhibit lines of code, the inhibiting mechanism is described. Two bit fields in the microcode performing the branch, early no-operation bit field (ENOP) 102 and late no-operation bit field (LNOP) 104, may be selectively set to inhibit lines of microcode. If a fast branch is being taken the ENOP field 102 inhibits the rank two operation of the current line; if it is a slow branch, ENOP 102 inhibits the rank two operation of the next line of code. The LNOP field, if a fast microbranch is taken, inhibits the next line of microcode in the pipeline and if a slow branch is taken, inhibits the rank two operation of the line of microcode one level further in the pipeline.

Microcode bits 102 and 104, along with the other microcode fields, are passed on successive clock cycles through rank two register 80 and rank three register 92. When these two bits are in the rank two position in the pipeline, they work in the conjunction with FMET flip-flop 32 to determine which, if any, lines of microcode to inhibit. When these bits are in the rank three stage of the pipeline, they work in conjunction with SMET flip-flop 30 to determine which, if any, lines of code to inhibit.

Since, in the preferred embodiment shown in FIG. 2, the decision making hardware is AND gate based, it will be obvious that if neither fast test met flip-flop 32 nor slow test met flip-flop 30 is set (i.e., holds a logic one) no lines of code will be inhibited since no branching has been selected. However, if either one or both of these flip-flops has been set, the decision to inhibit microcode lines rests entirely with the ENOP 102 and LNOP 104 portions of the microcode. If neither of these bits is a logic one, then no lines of microcode are inhibited. However, if one or both of these lines is a logic one, the inhibition hardware performs as follows.

In the case of a fast branch, assume that fast test MET flip-flop 32 has been set. Thus, on one of the inputs of both AND gates 106 and 108 a one will appear. If LNOP bit 104 has been set then AND gate 106 will present a one at its output. This represents the signal to inhibit the next line of microcode. If the ENOP bit 102 has been set AND gate 108 presents a one at its output. This is the signal to inhibit the current line of microcode. Regardless of the state of SMET flip-flop 30 the presence of a logic one at the output of AND gate 106 will cause a logic one to appear at the output of OR gate of 110 and hence, the NOP1 signal 112 will be a logic one. NOP1 signal 112 is used to inhibit operations taken as a result of rank one microcode options. The output of OR gate 110 is also presented to the D input of flip-flop 114. Flip-flop 114 provides a delay of one clock cycle before presenting the logic one at the output of gate 110 to the input of OR gate 116, and thus, to the NOP 2 output 118. The NOP2 output 118 is used to inhibit all of the rank two operations of the microcode.

When slow test met flip-flop 30 has presented a logic one at its output, this logic one is presented to AND gate 120 and 122. The presence of a one in the ENOP bit 102 position in the rank three register will enable AND gate 122. The output of AND gate 122 is the next microinstruction inhibit signal which is presented to OR gate 116 which asserts NOP2 118. If the LNOP bit 104 position in the rank three register has been set it will act through AND gate 120 to place a one at the output of OR gate 110, asserting NOP1 output 112. This one bit will progate through flip-flop 114 one clock pulse later and present itself at the output NOP2 via OR gate 116.

In a preferred embodiment of the present invention, guesses can be made with regard to test results which are not yet available and microbranching decisions made as a result of those guesses. Guesses being what they are, there are instances in which a guess has been made which turns out to be incorrect. The hardware of the present invention via pause logic block 56 of FIG. 1, allows the correct values to be placed in the SMET flip-flop and the FMET flip-flop 30 and 32, respectively, which then allows the correct choice of address to be placed on control store address bus via 4:1 multiplexer 12, and the correct values for NOP1 and NOP2 to be placed on lines 86 and 88.

Figure 3:
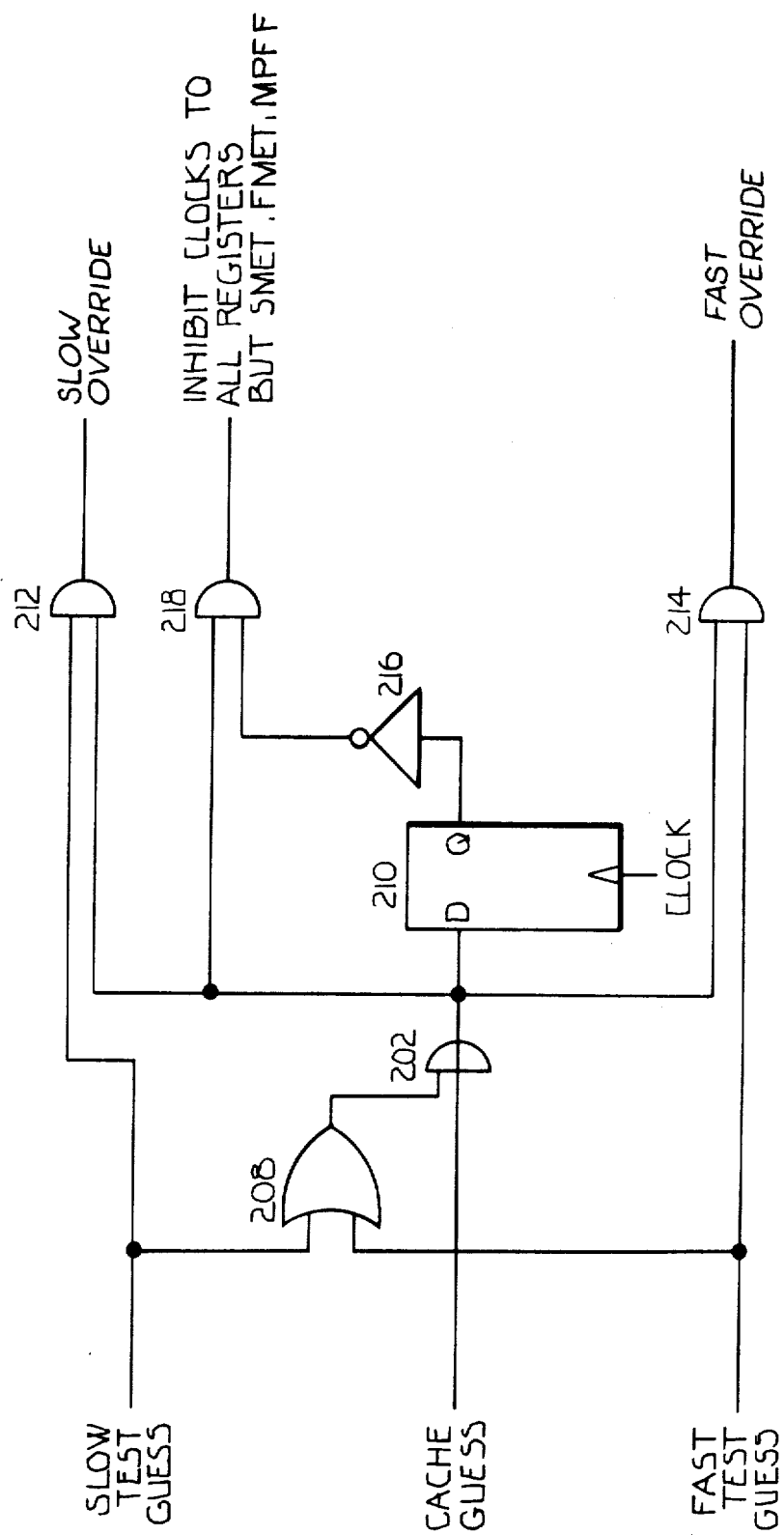
FIG. 3 is a logic level diagram of the hardware for revectoring to a correct address after an incorrect assumption on microbranching has been made, including hardware for pausing system clocks when the revectoring is performed.

Referring to FIG. 3, the hardware for vectoring to the correct address during a pause is now described.

As an example of an incorrect guess which could be made, reference is made to a cache which is used to hold instructions or data. In any cache, if the requested data or code is not present, a signal will be generated indicating a cache "miss".

Cache and cache "miss" hardware are well known in the art, and are beyond the scope of the present invention. Assume for purposes of the present disclosure that the cache miss signal is a logical one appearing on line 200. This logical one is passed through AND gate 202 only if a microcode field has indicated that the guess was going to be made. The microcode field which indicates whether this guess was made for a slow or fast mode is decoded to generate signals which appear on lines 204 and 206 respectively. A logical one on one of these lines indicates that a guess was made. Either logical one will enable the second input to AND gate 202 via OR gate 208. The output of AND gate 202 drives the D input of flip-flop 210 and AND gates 212 and 214. The fact that a guess was made, indicated by a one on either line 204 or 206 when ANDed with the output from gate 202 produces a signal which indicates a fast or slow test operation currently in progress should be overridden in order to correct the current value if FMET or SMET flip-flop 30 or 32. AND gates 212 and 214 use this signal to determine whether SMET 30 or FMET 32 is to be corrected.

Referring momentarily to FIG. 1, these override signals are placed on lines 58 and 60, respectively. The purpose of flip-flop 210 in FIG. 3 is to allow the clock cycle currently under execution to be completed before any subsequent clock pauses occur in order to avoid locking up the CPU. In the case of an incorrect guess, of course, an incorrect vector appears on control store address lines 10 for one clock cycle while the correct choice is loaded through multiplexer 12 to control storage address bus 10. The clocks to all registers except SMET 30, FMET 32 and flip-flop 210 are inhibited for one cycle. This occurs, as shown in FIG. 3, by connecting the signal from invertor 216 to AND gate 218, to produce the inhibit signal.

Figure 4:
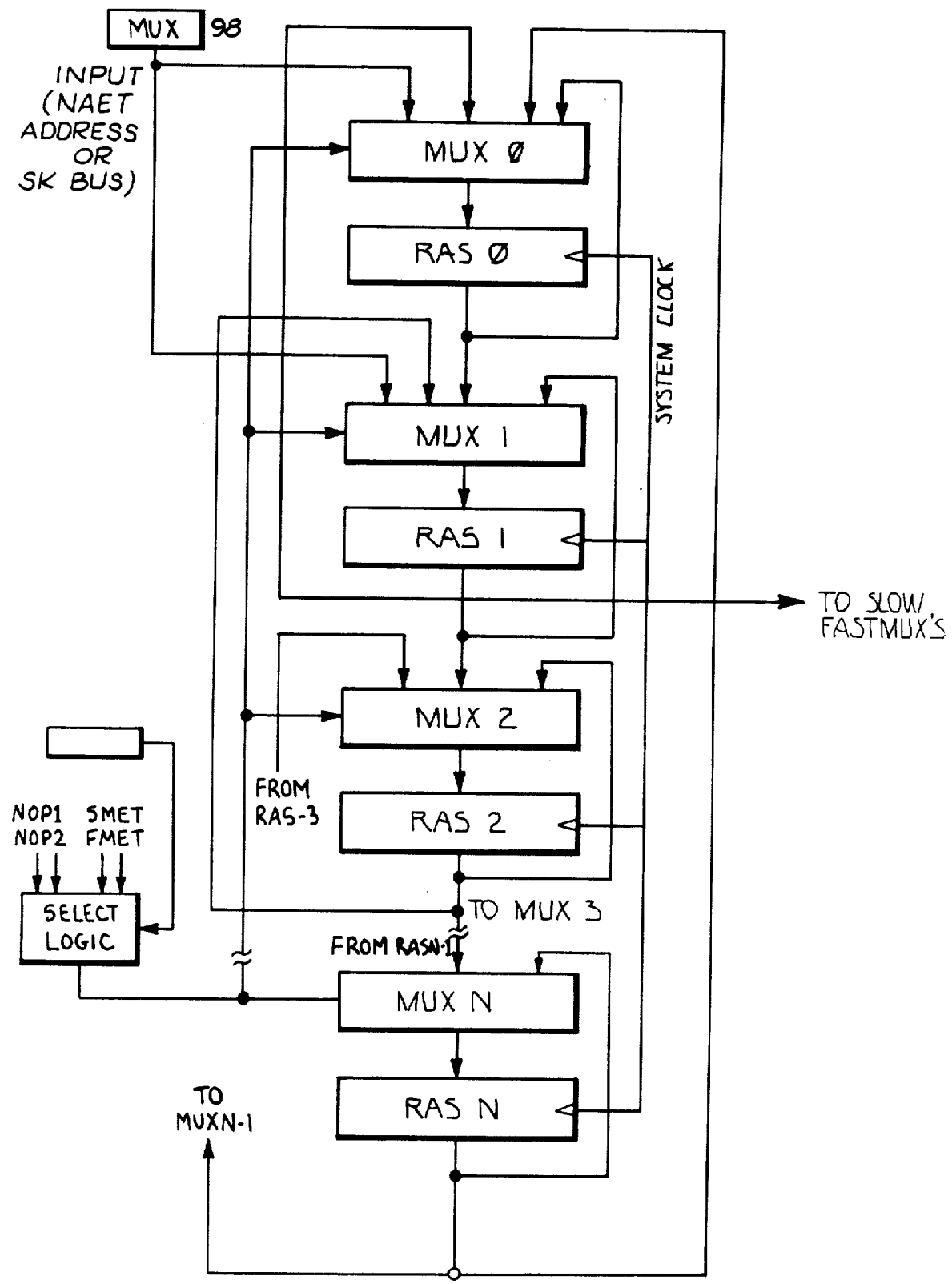
FIG. 4 is a block diagram of a preferred embodiment of a return address stack according to the present invention.

Referring now to FIG. 4, a preferred embodiment of the return address stack is shown. The return address stack may be configured of multiplexers and registers. The multiplexers act to couple the registers into a passthrough, recirculate, or feedback arrangement. Although those skilled in th art well know that any number of stages can be used, the embodiment of FIG. 4 as shown has N stages.

Referring first to MUX0 220 it can be seen that MUX0 220 may either load RAS0 222 from MUX 98 via line 224, receive the contests of return address stack register RASN 226 via line 228, recirculate the contents from its own RAS0 222 via line 230, or receive the contents of RAS1 232 via line 234. Similarly, MUX 1 236 may load RAS1 232 from from MUX 98 via line 238, may receive the contents of RAS0 222 via line 240, may recirculate the contents of RAS1 232 via line 242, or may receive the contents of RAS2 244 via line 246.

MUX0 220 and MUX1 236 are the only multiplexers which may be loaded from MUX 98. All other multiplexers in the system may only take the contents of the immediately preceeding register, recirculate the contents of its accompanying register, or receive the contents of the next register in line. In this manner, data may be passed down the stack, up the stack or stand still.

Multiplexer control is made via a select logic unit 270 which places a signal on lines 272. This signal controls all of the multiplexers in the return address stack and determines the flow pattern in the registers. Select logic unit 270 is driven by the signals NOP1 and NOP2 (generated as disclosed with respect to FIG. 2) and by the outputs from the SMET and FMET flip-flops 32 and 30 (from FIG. 1). In addition, a field from the rank two portion of microcode is presented to select logic unit 270 via line 274.

The operation of the stack is as follows. Normally, select logic unit 270 causes the stack registers to recirculate. When a subroutine call is taken, a return address is placed on the stack at either RAS0 or RAS1 depending on whether a fast or slow call has been taken. Select logic unit 270 conditions the stack multiplexers to push the contents of all stack registers forward. Microcode determines whether the contents of R1ADR register 96 or the SK bus 100 are placed on the stack.

If a slow subroutine call has been taken, a microcode field 274 causes MUX0 to load RAS0 when the instruction which made the call is in rank two of execution. On the next clock pulse the stack is pushed only if SMET flip-flop has been set.

Similarly, if a fast call has been taken, MUX1 is caused to load RAS1 when the instruction which made the call is in rank two of execution. Unlike ths slow call, however, neither loading nor pushing take place unless FMET flip-flop 37 has been set.

From FIG. 4 it can be seen that the load and push operations are decoupled from one another. Hardware which would normally have to provide copies of the return address until the branching decision had been resolved is not necessary by use of this stack.

The popping of the stack, or returning from subroutine calls, operates as follows.

In a slow return, microcode field 274 in conjunction with SMET flip-flop 30, through select logic unit 270 conditions the stack multiplexers to pass register contents up the stack (known as popping). This occurs when the instruction specifying the return is in rank three of its execution and SMET is set. The output of RAS1 232 is supplied to multiplexer 64 on the clock pulse prior to popping the stack.

Similarly, a fast return pops the stack when the instruction specifying the return is in rank two of execution and FMET is set. It should be noted that, due to pipelining, there are cases in which a conflict between pushing and popping could occur. In these cases, neither occurs. However, loading does occur.

If the signal NOP2 occurs at the input of select logic unit 270 during the rank two execution of either a fast or slow call or return, no loading, pushing, or popping occurs.

An alternative design for the stack is to employ a dual ported register file with decoupled pointers for storing data into the stack and reading data out of the stack.

Figure 5:
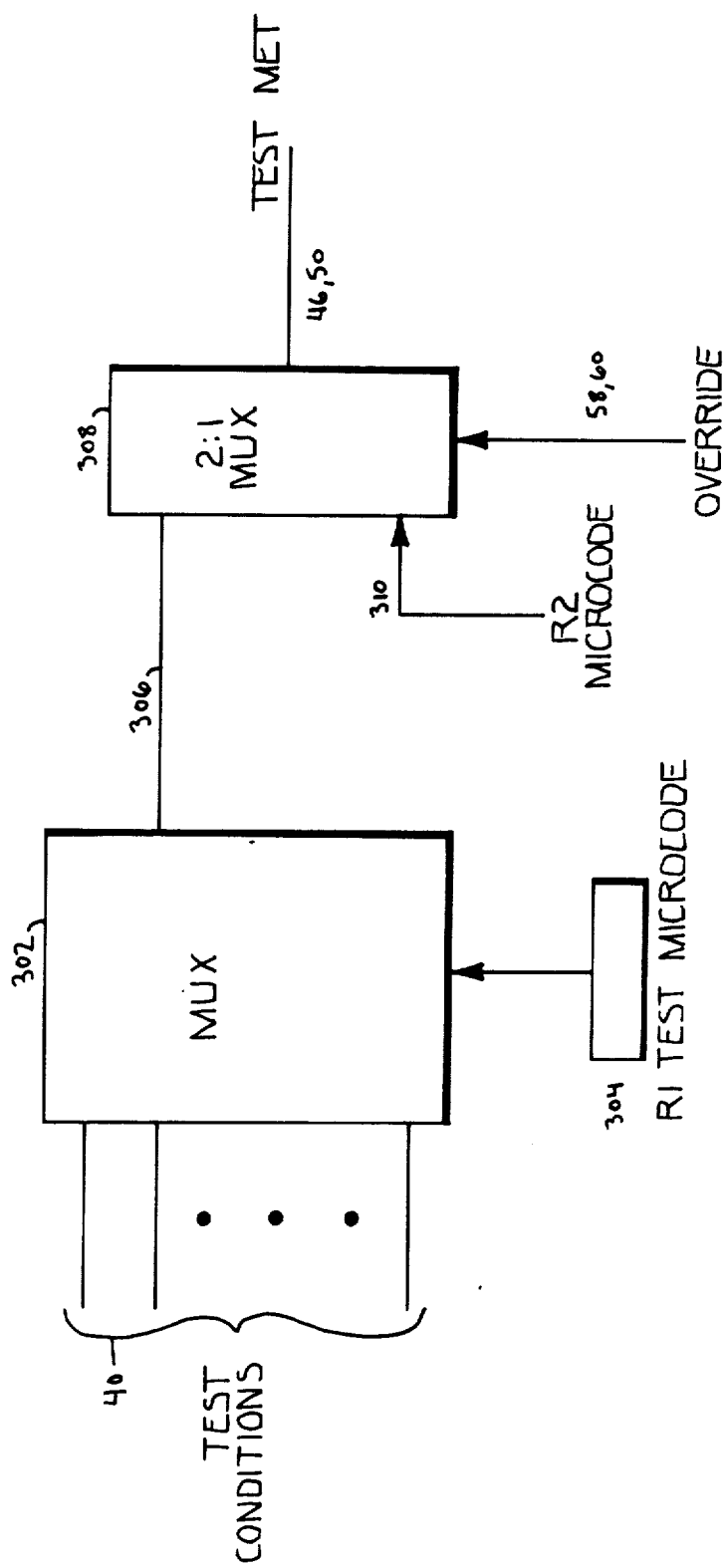
FIG. 5 is a block diagram of hardware for implementing the decision to microbranch which may select from a plurality of available test conditions.

Referring now to FIG. 5, a block level diagram of the test select logic for fast and slow test selection, the operation of those modules will now be described. As shown in FIG. 3, numerous test conditions shown diagramatically at 40 are presented to the inputs of multiplexer 302. The selection of which input to pass through multiplexer 302 is made by a microcode field in the rank one level of the microcode shown at 304. The output of multiplexer 302 on line 306 is placed in one input of 2:1 override multiplexer 308. The other input to 2:1 multiplexer 308 is from a field in the part of the microcode which determines whether the test MET condition is either positive true or negative true. The multiplexer is driven by override input 58 or 60 depending on whether this unit represents the slow selector or the fast selector. The output of multiplexer 308 is test MET line 46 or 50 depending on which module is being discussed. Thus it can be seen by those skilled in the art that any one of a number of test conditions may be used to set either SMET or FMET flip-flops 30 or 32, respectively. The selection of the condition is completely under the control of microcode. The presence of an override condition is the result of the selection of a test condition made by a previous line of microcode.

We claim:

1. Hardware for performing microbranching in a central processing unit of a data processing system including:

means for holding a first address for the next sequential microinstruction to be executed;

means for holding a second address for a fast microbranch;

means for holding a third address for a slow microbranch;

selection means for selecting one of said first, second and third addresses, and placing it on a control store address bus;

means for controlling said selection means in response to test conditions selected by microcode.

* * * * *